United States Patent
Sanefuji et al.

(10) Patent No.: US 10,131,120 B2
(45) Date of Patent: Nov. 20, 2018

(54) LAMINATED FILM AND LAMINATED MOLDED ARTICLE

(75) Inventors: Koichiro Sanefuji, Hiroshima (JP); Yuhei Konokawa, Hiroshima (JP); Yoshinori Abe, Hiroshima (JP)

(73) Assignee: Mitsubishi Chemical Corporation, Tokyo (JP)

( * ) Notice: Subject to any disclaimer, the term of this patent is extended or adjusted under 35 U.S.C. 154(b) by 611 days.

(21) Appl. No.: 14/344,219

(22) PCT Filed: Sep. 12, 2012

(86) PCT No.: PCT/JP2012/073371
§ 371 (c)(1),
(2), (4) Date: Mar. 11, 2014

(87) PCT Pub. No.: WO2013/039119
PCT Pub. Date: Mar. 21, 2013

(65) Prior Publication Data
US 2014/0342162 A1 Nov. 20, 2014

(30) Foreign Application Priority Data

Sep. 12, 2011 (JP) .................... 2011-198628
Nov. 1, 2011 (JP) .................... 2011-240284

(51) Int. Cl.
| | | |
|---|---|---|
| *B32B 27/08* | (2006.01) | |
| *B29C 43/00* | (2006.01) | |
| *B29C 43/20* | (2006.01) | |
| *B29C 45/16* | (2006.01) | |
| *B32B 27/30* | (2006.01) | |
| *C08F 265/06* | (2006.01) | |
| *B29C 45/14* | (2006.01) | |
| *C08F 285/00* | (2006.01) | |
| *C08L 27/16* | (2006.01) | |
| *C08L 51/00* | (2006.01) | |
| *B29K 101/12* | (2006.01) | |
| *B29K 619/00* | (2006.01) | |
| *B29L 9/00* | (2006.01) | |

(52) U.S. Cl.
CPC ........... *B32B 27/08* (2013.01); *B29C 43/003* (2013.01); *B29C 43/203* (2013.01); *B29C 45/14811* (2013.01); *B29C 45/1671* (2013.01); *B32B 27/304* (2013.01); *B32B 27/308* (2013.01); *C08F 265/06* (2013.01); *C08F 285/00* (2013.01); *C08L 27/16* (2013.01); *C08L 51/003* (2013.01); *B29C 45/14311* (2013.01); *B29C 2045/1664* (2013.01); *B29C 2045/1693* (2013.01); *B29K 2101/12* (2013.01); *B29K 2619/00* (2013.01); *B29K 2627/16* (2013.01); *B29L 2009/00* (2013.01); *B32B 2250/02* (2013.01); *B32B 2250/03* (2013.01); *B32B 2250/246* (2013.01); *B32B 2270/00* (2013.01); *B32B 2274/00* (2013.01); *B32B 2305/72* (2013.01); *B32B 2319/00* (2013.01); *B32B 2327/12* (2013.01); *B32B 2333/08* (2013.01); *B32B 2419/00* (2013.01); *B32B 2605/08* (2013.01); *Y10T 428/3154* (2015.04)

(58) Field of Classification Search
None
See application file for complete search history.

(56) References Cited

U.S. PATENT DOCUMENTS

| | | | | |
|---|---|---|---|---|
| 2005/0019584 A1* | 1/2005 | Tsuda | ............... | B32B 27/30 |
| | | | | 428/421 |
| 2010/0092792 A1* | 4/2010 | Inari | ............... | B32B 15/08 |
| | | | | 428/458 |

FOREIGN PATENT DOCUMENTS

| | | | | |
|---|---|---|---|---|
| EP | 1798253 A1 | 6/2007 | | |
| JP | 3-38338 | 2/1991 | | |
| JP | 3-288640 | 12/1991 | | |
| JP | 6-286077 | 10/1994 | | |
| JP | 11333992 A | * 12/1999 | ............ | B32B 27/08 |
| JP | 2001-1478 | 1/2001 | | |
| JP | 2002-19051 | 1/2002 | | |
| JP | 2002019051 A | * 1/2002 | | |
| JP | 2002-103538 | 4/2002 | | |
| JP | 2003-236998 | 8/2003 | | |
| JP | 2005-163003 | 6/2005 | | |
| JP | 2009-228000 | 10/2009 | | |
| JP | 2011-168681 | 9/2011 | | |
| WO | 2011/142453 A1 | 11/2011 | | |

OTHER PUBLICATIONS

Machine Translation, Akatsu—JP 2002019051 A (2002).*
Lee, PVDF, Encyclopedia of Chemical Processing, 2006, Taylor and Francis, vol. 2, p. 1039.*
Aldrich, Reference: Polymer Properties, Thermal Transitions of Homopolymers, retrieved Jun. 29, 2016, pp. 1-2, https://www3.nd.edu/~hgao/thermal_transitions_of_homopolymers.pdf.*
Malshe et al., Thermosetting Powder Coatings, Basics of Paint Technology, Sevak Printers, 2008, p. 17.*
Senda et al., JP 11-333992A, Machine Translation (Year: 1999).*
Extended European Search Report issued in counterpart European Patent Application No. EP12832031.4 dated Jan. 29, 2015.
Office Action issued in counterpart Chinese Patent Application No. 2012800552665 dated Dec. 12, 2014.

* cited by examiner

*Primary Examiner* — Callie E Shosho
*Assistant Examiner* — Patrick N English
(74) *Attorney, Agent, or Firm* — Morgan, Lewis & Bockius LLP

(57) ABSTRACT

A transparent laminated film is described, which has excellent chemical resistance and surface hardness, is glossy even after heating and which has a low haze value, and a laminated molded article that uses the film.

15 Claims, No Drawings

LAMINATED FILM AND LAMINATED MOLDED ARTICLE

TECHNICAL FIELD

The present invention relates to a transparent laminated film and a laminated molded article employing the film.

BACKGROUND ART

As a method for applying a design characteristic to a molded article inexpensively, an insertion molding method and an in-mold molding method have been known. The insertion molding method is a method of obtaining a molded article by: molding a film or sheet made of polyester resin, polycarbonate resin, acrylic resin or the like with a decorative pattern such as printing to a 3-dimensional shape in advance by vacuum molding or the like; removing unwanted film or sheet portions; transferring this 3-dimensional molded article into an injection molding mold; and injection molding a resin as a base material, thereby integrating the 3-dimensional molded article with the base material. The in-mold molding method is a method of obtaining a molded article by: placing a film or sheet made of polyester resin, polycarbonate resin, acrylic resin or the like with a decorative pattern such as printing in an injection molding mold; vacuum molding the film or sheet; and injection molding a resin as a base material in the same mold, thereby integrating the film or sheet with the base material.

Patent Document 1 discloses an acrylic resin film suitable for the insertion molding and in-mold molding that is superior in surface hardness, heat resistance, and molding whitening-resistance, the acrylic resin film being obtained by blending a rubber-containing polymer of a particular composition with a thermoplastic polymer of a particular composition at a particular ratio. However, acrylic resin films generally do not have sufficient chemical resistance.

Patent Document 2 discloses a laminated film having chemical resistance improved by providing a vinylidene fluoride resin in a surface layer of an acrylic resin film.

CITATION LIST

Patent Literature

Patent Literature 1: Japanese Unexamined Patent Application Publication No. 2005-163003
Patent Literature 2: Japanese Unexamined Patent Application Publication No. H03-288640

DISCLOSURE OF THE INVENTION

Problems to be Solved by the Invention

However, the laminated film of Patent Document 2 may be, in some cases, difficult to be employed for uses that require shiny appearance, since the vinylidene fluoride resin in a surface layer thereof has a great haze value. In addition, the shiny appearance of the laminated film may be further deteriorated, because the vinylidene fluoride resin, which is heated for molding in a mold or for lamination with a base material, recrystallizes upon cooling and crystal size increases.

The objective of the present invention is to provide a transparent laminated film and a laminated molded article employing the film, that have superior chemical resistance and surface hardness, as well as shiny appearance even after heating and a low haze value.

Means for Solving the Problems

The present invention has the following characteristics [1] to [7].

[1] A laminated film comprising: a layer of a polymer blend (X) of a vinylidene fluoride resin (F) and an acrylic resin and a layer of an acrylic resin composition (Y), wherein the laminated film satisfies the following conditions (1) to (3):
(1) the haze value is no greater than 2 after the film is heated to 180° C. and then is allowed to naturally cool until the temperature drops to 25° C.;
(2) pencil hardness of the layer of the polymer blend (X) is HB or harder;
(3) heat of crystal fusion of the polymer blend (X) as determined using a differential scanning calorimeter is 20 to 40 J/g.

[2] The laminated film as described in the above [1], wherein the polymer blend (X) consists of the vinylidene fluoride resin (F) and the acrylic resin (A1) which has a glass transition temperature of 95 to 120° C.; and a content ratio of the vinylidene fluoride resin (F)/the acrylic resin (A1) is 62 to 78/38 to 22 (% by mass).

[3] The laminated film as described in the above [1] or [2], wherein the acrylic resin composition (Y) comprises a rubber-containing polymer (G) and a thermoplastic polymer (A2) that contains at least 50% by mass of an alkyl methacrylate ester unit.

[4] The laminated film as described in any of the above [1] to [3], wherein the rubber-containing polymer (G) is a rubber-containing polymer obtained by graft polymerization of a monomer mixture (g) specified below in the presence of a polymer (C) obtained by polymerization of a monomer mixture (c) specified below;
the monomer mixture (c):
  (c1) 50 to 99.9% by mass of alkyl acrylate ester;
  (c2) 0 to 49.9% by mass of alkyl methacrylate ester;
  (c3) 0 to 20% by mass of another monomer having 1 polymerizable double bond; and
  (c4) 0.1 to 10% by mass of a multifunctional monomer having at least 2 polymerizable double bonds,
where a polymer obtained from the monomer mixture (c) has a glass transition temperature of lower than 25° C.
the monomer mixture (g):
  (g1) 0 to 20% by mass of alkyl acrylate ester;
  (g2) 51 to 100% by mass of alkyl methacrylate ester; and
  (g3) 0 to 49% by mass of another monomer having 1 polymerizable double bond.

[5] The laminated film as described in any of the above [1] to [4], wherein a rate of hetero linkage in the vinylidene fluoride resin (F) is no greater than 10%.

[6] A laminated molded article wherein the laminated film as described in any of the above [1] to [5] is laminated on a base material.

[7] A method for manufacturing a laminated molded article comprising: vacuum-molding or pressure-molding the laminated film as described in any of the above [1] to [5] in a first mold to thereby prepare a preform molded body; and injection-molding a resin as a base material in a second mold to thereby integrate the preform molded body with the base material.

Effects of the Invention

According to the present invention, a transparent laminated film and a laminated molded article employing the film can be provided, that have superior chemical resistance and surface hardness, as well as shiny appearance even after heating and a low haze value.

MODE FOR CARRYING OUT THE INVENTION

A preferred embodiment of the laminated film and a method for manufacturing the film according to the present invention is described hereinafter. It should be noted that, as used herein, a "film" is a planar material having a thickness of approximately 0.01 mm to 0.5 mm, and includes a matter called "sheet-like member".

<Laminated Film>

The laminated film of the present invention is composed of: a layer of a polymer blend (X) of a vinylidene fluoride resin (F) and an acrylic resin (hereinafter may be referred to as "(X) layer" and "film (X)") and a layer of an acrylic resin composition (Y) (hereinafter may be referred to as "(Y) layer" and "film (Y)"). It should be noted that the laminated film can be configured either in a double layered structure of the (X) layer and the (Y) layer, or in a triple layered structure in which the (X) layer is present on both sides of the (Y) layer. The term "polymer blend" indicates a mixture of a plurality of resins.

<Layer of Polymer Blend (X)>

The polymer blend (X) is composed of a vinylidene fluoride resin (F) and an acrylic resin. The vinylidene fluoride resin (F) and the acrylic resin can be either at least a single kind of resin or at least 2 kinds of resin, respectively.

The polymer blend (X) is preferably a polymer blend of a vinylidene fluoride resin (F) (hereinafter may be referred to as "resin (F)") and an acrylic resin (A1) having a glass transition temperature of 95 to 120° C. (hereinafter may be referred to as "resin (A1)"). In addition, the polymer blend (X) preferably includes 62 to 78% by mass of the resin (F) and 38 to 22% by mass of the resin (A1) with respect to 100% by mass of a total amount of the resin (F) and the resin (A1). It should be noted that an additive (described later) can be added to the polymer blend.

In the present invention, the glass transition temperature of a resin can be measured by using a DSC (differential scanning calorimeter). The "glass transition temperature" is a temperature measured as "an extrapolated starting temperature of glass transition" by raising the temperature at a rate of temperature increase of 10° C./min according to the method described in JISK7121, 3.(2).

The content of the resin (F) and the resin (A1) in the polymer blend (X) can be determined by gas chromatography-mass spectrometry.

[Vinylidene Fluoride Resin (F)]

The vinylidene fluoride resin (F) that can compose a part of the polymer blend (X) in the present invention can be any resin containing a vinylidene fluoride unit; for example, a homopolymer composed only of a vinylidene fluoride unit, and a copolymer containing a vinylidene fluoride unit. The mass average molecular weight of the resin (F) is preferably at least 100,000 from the viewpoint of chemical resistance, and no greater than 300,000 from the viewpoint of a film forming property.

The content of the vinylidene fluoride unit in the copolymer is preferable at least 85% by mass from the viewpoint of compatibility between the resin (F) and the resin (A1). In a case in which the resin (F) is a copolymer, a copolymerizable component that is copolymerized with vinylidene fluoride can be selected as appropriate from materials known in the technical field of resin film; for example, hexafluoropropylene and tetrafluoroethylene can be used. Either a single kind or at least 2 kinds of the copolymerizable component can be used.

However, the resin (F) is preferably polyvinylidene fluoride, from the viewpoint of obtaining the film (X) that is superior in transparency and heat resistance.

The resin (F) preferably has a high crystalline fusing point. More specifically, the crystalline fusing point of the resin (F) is preferably at least 150° C. and more preferably at least 160° C., from the viewpoint of heat resistance. In addition, the upper limit of the crystalline fusing point is preferably approximately 175° C., which is equal to the crystalline fusing point of polyvinylidene fluoride. It should be noted that the crystalline fusing point indicates a "fusion peak temperature" measured according to a method described in JISK7121, 3.(2).

The resin (F) can be either a kind of resin used singly, or at least 2 kinds of resin used in combination. As the resin (F), the following commercial products can be exemplified; Kynar720 (trade name) (vinylidene fluoride content: 100% by mass, crystalline fusing point: 169C) and Kynar710 (trade name) (vinylidene fluoride content: 100% by mass, crystalline fusing point: 169° C.) manufactured by ARKEMA K.K.; KFT #850 (trade name) (vinylidene fluoride content: 100% by mass, crystalline fusing point: 173° C.) manufactured by KUREHA Corporation; Solef1006 (trade name) (vinylidene fluoride content: 100% by mass, crystalline fusing point: 174° C.) and Solef1008 (trade name) (vinylidene fluoride content: 100% by mass, crystalline fusing point: 174° C.) manufactured by Solvay Solexis K.K.

The vinylidene fluoride resin (F) has 3 linkage modes as linkage modes of monomer: head to head linkage; tail to tail linkage; and head to tail linkage, in which the head to head linkage and the tail to tail linkage are referred to as "hetero linkage". From the viewpoint of increasing the chemical resistance of the film (X), a "rate of hetero linkage" in the resin (F) is preferably no greater than 10%. From the viewpoint of lowering the rate of hetero linkage, the resin (F) is preferably a resin produced by suspension polymerization.

The "rate of hetero linkage" can be determined from a diffraction peak of a 19F-NMR spectrum of the resin (F). More specifically, 40 mg of the resin (F) is dissolved in 0.8 ml of deuterated dimethylformamide (D7-DMF), and 19F-NMR is measured at ambient temperature. The spectrum of 19F-NMR thus obtained has 5 major peaks at positions of: −91.5 ppm, −92.0 ppm, −94.7 ppm, −113.5 ppm and −115.9 ppm. Among these peaks, the peaks at −113.5 ppm and −115.9 ppm are identified as peaks originated from the hetero linkage. Given this, the rate of hetero linkage is calculated by the following equation, where ST being a total of areas of the 5 peaks; S1 being an area of −113.5 ppm; and S2 being an area of −115.9 ppm.

Rate of hetero linkage=[{($S1+S2$)/2}/$ST$]×100(%).

The resin (F) can include a flatting agent to such a degree that the transparency of the film (X) is not deteriorated. As the flatting agent, an organic flatting agent and an inorganic flatting agent can be used.

[Acrylic Resin (A1)]

The acrylic resin (A1) that can compose a part of the polymer blend (X) has a glass transition temperature of 95 to 120° C. The glass transition temperature (hereinafter also referred to as "Tg") of at least 95° C. means that the film (X) has superior surface hardness. In addition, Tg of the acrylic resin (A1) of no greater than 120° C. means that the film (X)

has superior moldability. The mass average molecular weight of the resin (A1) is preferably at least 30,000 from the viewpoint of the mechanical property of the film (X), and no greater than 200,000 from the viewpoint of moldability of the film (X).

It should be noted that the resin (A1) can be a polymer obtained from monomer of either or both of acrylic ester and methacrylic ester, and preferably a polymer containing at least 70% by mass of methacrylic ester unit. In addition, a monomer unit (for example, an acrylic acid unit) that can be copolymerized with these esters can be included.

Among these, from the viewpoint of obtaining the film (X) superior in surface hardness, alkyl methacrylate ester, of which homopolymer has a glass transition temperature is at least 95° C., is preferably used as a monomer as a material for the resin (A1). Alkyl methacrylate ester meeting these requirements includes: methyl methacrylate (MMA); t-butyl methacrylate; t-butylcyclohexyl methacrylate; isobornyl methacrylate; and the like. It should be noted that an alkyl group in alkyl methacrylate ester can be either branched chain or straight chain. In addition, it is preferable that the carbon number of the alkyl group of the alkyl methacrylate ester is no greater than 4, from the viewpoint of heat resistance of the film (X).

As described above, the resin (A1) can be either a homopolymer obtained from alkyl methacrylate ester or a copolymer obtained from alkyl methacrylate ester and a monomer (for example, methacrylic acid and styrene) that can be copolymerized with the ester. The content of the alkyl methacrylate ester unit in the resin (A1) is preferably at least 80% by mass from the viewpoint of surface hardness and heat resistance of the film (X), and no greater than 99% by mass from the viewpoint of thermal decomposition resistance of the film (X).

In addition, from the viewpoint of compatibility between the resin (A1) and the resin (F), the total content of the alkyl acrylate ester unit and the alkyl methacrylate ester unit in the resin (A1) is preferably at least 80% by mass. The resin (A1) can include a rubber-containing polymer (G), which is described later, to such a degree that the transparency of the film (X) is not deteriorated.

[Additives]

General additives used in a field of resin film can be added to the polymer blend (X) used for the laminated film of the present invention, as necessary. As the additives, stabilizer, antioxidant, lubricant, processing aid, plasticizer, impact resistant agent, blister agent, filler, antimicrobial agent, fungicide, parting agent, antistatic agent, coloring agent, UV absorber, light stabilizer, flame retardant, and the like can be exemplified.

As the antioxidant, for example, a phenol-based antioxidant, a sulfur-based antioxidant, and a phosphorus-based antioxidant and the like can be used. As a thermal stabilizer, for example, a hindered phenol-based thermal stabilizer, a sulfur-based thermal stabilizer, and a hydrazine-based antioxidant can be used. As the plasticizer, depending on a kind of resin composing the polymer blend (X), a phthalate ester-based plasticizer, a phosphoric acid ester-based plasticizer, a fatty acid ester-based plasticizer, an aliphatic dibasic acid ester-based plasticizer, an oxybenzoic acid ester-based plasticizer, an epoxy-based plasticizer, a polyester-based plasticizer and the like can be used, for example. As the lubricant, for example, a fatty acid ester-based lubricant, a fatty acid-based lubricant, a metallic soap-based lubricant, a fatty acid amide-based lubricant, a higher alcohol-based lubricant, a paraffin-based lubricant and the like can be used. As the antistatic agent, for example, a cation-based antistatic agent, an anion-based antistatic agent, a nonion-based antistatic agent, a zwitterion-based antistatic agent and the like can be used. As the flame retardant, for example, a bromine-based flame retardant, a phosphorus-based flame retardant, a chloride-based flame retardant, a nitrogen-based flame retardant, an aluminum-based flame retardant, an antimony-based flame retardant, a magnesium-based flame retardant, a boron-based flame retardant, a zirconium-based flame retardant and the like can be used. As the filler, for example, calcium carbonate, barium sulfate, talc, pyrophyllite, kaolin and the like can be used. Each of these additives can be used singly, or in combination of at least 2 kinds.

A method of polymerization for obtaining the resin (F) and the resin (A) is not particularly limited, and known methods such as emulsion polymerization and suspension polymerization can be employed.

The content of the resin (F) in the polymer blend (X) is preferably, in a case of using the resin (F) with the rate of hetero linkage being greater than 10%, 72 to 78% by mass (with respect to a total of the resin (F) and the resin (A1) being 100% by mass). The content is more preferably at least 73% by mass from the viewpoint of chemical resistance of the film (X), and more preferably no greater than 77% by mass from the viewpoint of transparency of the film (X). The content of the resin (F) in the polymer blend (X) is preferably, in a case of using the resin (F) with the rate of hetero linkage being no greater than 10%, 62 to 72% by mass.

The total content of the resin (F) and the resin (A1) in the polymer blend (X) is preferably 90 to 100% by mass. The content of the above described additive is preferably 0 to 10% by mass.

<Properties of Laminated Film>

The laminated film of the present invention is a film that satisfies the following conditions (1) to (3):

(1) the haze value is no greater than 2 after the film is heated to 180° C. and then is allowed to naturally cool until the temperature drops to 25° C.;

(2) pencil hardness of the layer of the polymer blend (X) is HB or greater; and (3) heat of crystal fusion of the polymer blend (X) as determined using a differential scanning calorimeter is 20 to 40 J/g.

The haze value, the pencil hardness and the heat of crystal fusion are measured by the following methods.

(1) The haze value: a haze value measured by a method defined by JISK7136. A laminated film at 25° C. is heated for 10 to 15 seconds up to 180° C., and then is allowed to naturally cool to 25° C. A haze value of the laminated film is measured by using an integrating sphere. A light source is D65. In the present invention, the haze, transmittance, reflecto-meter HR-100 (trade mark; manufactured by MURAKAMI COLOR RESEARCH LABORATORY CO., Ltd) is used as a measurement device.

(2) The pencil hardness: pencil hardness measured by a method defined by JISK5600-5-4, in a state in which a pencil is pressed against a surface of the layer of the polymer blend (X) of the laminated film under condition of angle of 45 degrees and pressure of 750 gram weight.

(3) The crystal fusion heat: a value measured by a method conforming to the method described in JISK7121, 3.(2). A fusion peak temperature is measured by raising the temperature of the polymer blend (X) at a rate of temperature increase of 10° C./min. An endothermic energy amount is obtained from an area of the fusion peak, the endothermic energy amount being a crystal fusion heat. In the present invention, a differential scanning calorimeter (manufactured by PerkinElmer Co., Ltd., trade name: Diamond DSC) is used as a measurement device. Other conditions are: mass of test piece: 10 mg; nitrogen gas pressure: 0.14 MPa; and reference material: indium.

The laminated film has the haze value of no greater than 2, and therefore has superior shiny appearance. In order to make the haze value no greater than 2, crystallinity of the polymer blend (X) is lowered. As a method for lowering crystallinity of the polymer blend (X), a method of lowering crystallinity of the vinylidene fluoride resin (F) and a method of setting a rate of mass of the vinylidene fluoride resin (F) with respect to the total mass of the vinylidene fluoride resin (F) and the acrylic resin (A1) to no greater than 78% by mass can be exemplified. The haze value is more preferably no greater than 1.0, yet more preferably no greater than 0.8, and particularly preferably no greater than 0.6, from the viewpoint of transparency of the laminated film.

The laminated film has superior surface hardness, since the pencil hardness of the layer of the polymer blend (X) is HB or greater. For making the pencil hardness HB or greater, a method of setting a rate of mass of the acrylic resin (A1) with respect to the total mass of the vinylidene fluoride resin (F) and the acrylic resin (A1) to at least 15% by mass, and a method of setting the glass transition temperature of the acrylic resin (A1) to 95 to 120° C. can be exemplified.

The laminated film has superior chemical resistance, since the heat of crystal fusion of the polymer blend (X) is 20 to 40 J/g. Since the heat of crystal fusion is at least 20 J/g, the laminated film can be easily manufactured without the laminated film adhering to a cooling roller during manufacture, and scrape and blocking can be easily avoided from being generated during conveyance of the laminated film. In order to set the heat of crystal fusion to 20 to 40 J/g, in a case in which the rate of hetero linkage in the vinylidene fluoride resin (F) used as a material exceeds 10%, it is preferable to set the rate of the vinylidene fluoride resin (F) in the polymer blend (X) to greater than 72% by mass and no greater than 78% by mass. The content of the vinylidene fluoride resin (F) in the polymer blend (X) is preferably, in a case in which the rate of hetero linkage is no greater than 10%, 62 to 72% by mass. The heat of crystal fusion is more preferably at least 20 J/g and no greater than 30 J/g.

With regard to the laminated film, a thinner film can be more easily made to be superior in transparency and a thicker film can be more easily made to be superior in mechanical strength. Given this, the laminated film is preferably 25 to 150 μm in thickness.

A ratio of the thickness of the (X) layer to the thickness of the (Y) layer ((X) layer/(Y) layer) is preferably 1/25 to 1/4. The ratio of the thickness at least 1/25 can easily prevent deterioration of the appearance due to roughness of the film surface. In addition, the ratio of the thickness no greater than 1/4 can give superior shiny appearance to the film surface. The ratio of the thickness is more preferably 1/25 to 1/9.

<Layer of Acrylic Resin Composition (Y)>

The laminated film of the present invention includes a layer of the acrylic resin composition (Y). The acrylic resin composition (Y) indicates a resin composition containing a (co)polymer having at least any one of an acrylic ester unit and a methacrylic ester unit. It should be noted that, from the viewpoint of moldability of the film (Y), the acrylic resin composition (Y) is preferably a composition containing a rubber-containing polymer (G) (hereinafter may also be referred to as "polymer (G)") which is described later and a thermoplastic polymer (A2) (hereinafter may also be referred to as "polymer (A2)") which is described later.

In a case in which the acrylic resin composition (Y) is composed of the polymer (G) and the polymer (A2), it is preferable that the polymer (G) is 1 to 99% by mass and the polymer (A2) is 99 to 1% by mass with respect to the total mass of both polymers being 100% by mass, from the viewpoint of moldability of the film (Y). In addition, the content of the polymer (G) in the total mass of both polymers being 100% by mass is more preferably at least 50% by mass and particularly preferably at least 70% by mass, from the viewpoint of molding whitening-resistance of the film (Y). From the same viewpoint, the content of the polymer (A2) in the total mass of both polymers being 100% by mass is more preferably no greater than 50% by mass and particularly preferably no greater than 30% by mass.

In addition, similarly to the polymer blend (X), the acrylic resin composition (Y) can contain the above described additives, in addition to the polymer (X) and the polymer (A2).

Gel content of the acrylic resin composition (Y) is preferably at least 10% by mass and no greater than 80% by mass, from the viewpoint of molding whitening-resistance and a film forming property of the film (Y). The gel content is more preferably at least 20% by mass and particularly preferably at least 40% by mass. In addition, the gel content is more preferably no greater than 75% by mass and particularly preferably no greater than 70% by mass.

In the present invention, the "gel content" is a value obtained by: extraction processing of a sample (for example, the resin composition (Y)) of a predetermined mass w1 (g) for 6 hours under reflux in acetone; separation of the processed liquid by centrifugation (14000 rpm for 30 minutes); removal of a solution by decantation; collection and drying (50° C. for 24 hours) of an acetone-insoluble matter; measurement of a mass w2 (g) of the acetone-insoluble matter; and calculation according to the equation below.

Gel content(% by mass)=$w2/w1 \times 100$

[Rubber-Containing Polymer (G)]

The rubber-containing polymer (G) that can compose a part of the acrylic resin composition (Y) in the present invention indicates a polymer having a 3 dimensional net-like structure obtained by polymerization of a monofunctional monomer and a polyfunctional monomer which are described later.

Gel content of the polymer (G) is preferably at least 50% by mass and more preferably at least 60% by mass, from the viewpoint of molding whitening-resistance of the film (Y). From the viewpoint of molding whitening-resistance of the film (Y), the greater gel content is more advantageous; however, from the viewpoint of moldability of the film (Y), the gel content is preferably no greater than 80% since at least a certain amount of free polymer is desirable to be present.

The mass average molecular weight of the polymer (X) is preferably at least 30,000 from the viewpoint of the mechanical property of the film (Y), and no greater than 200,000 from the viewpoint of moldability of the film (Y).

The mass average particle diameter of the polymer (G) is preferably at least 0.03 μm from the viewpoint of the mechanical property of the film (Y). The mass average particle diameter is preferably no greater than 0.03 μm, more preferably no greater than 0.15 μm, and particularly preferably no greater than 0.13 μm from the viewpoint of molding whitening-resistance, transparency, and transparency maintenance upon heating during insertion molding or in-mold molding of the film (Y). The mass average particle diameter is more preferably at least 0.07 μm, and particularly preferably at least 0.09 µm, from the viewpoint of the mechanical property of the film (Y). The "mass average particle diameter" can be measured by dynamic light scattering using a light scattering photometer DLS-700 (trade name) manufactured by OTSUKA ELECTRONICS CO., LTD.

From the viewpoint of molding whitening-resistance of the film (Y), the polymer (G) is preferably a rubber-containing polymer obtained by graft polymerization of a monomer mixture (g) specified below in the presence of a polymer (C) obtained by polymerization of a monomer mixture (c) specified below. A rubber-containing polymer obtained by graft polymerization of the monomer mixture (g) specified below in the presence of a polymer (C) obtained by polymerization of a monomer mixture (c) specified below and further polymerization of a monomer mixture (i) specified below.

The monomer mixture (c) is a mixture of the following monomer (c1), monomer (c2), monomer (c3) and polyfunctional monomer (c4).
(c1) 50 to 99.9% by mass of alkyl acrylate ester;
(c2) 0 to 49.9% by mass of alkyl methacrylate ester;
(c3) 0 to 20% by mass of another monomer having 1 polymerizable double bond; and
(c4) 0.1 to 10% by mass of a polyfunctional monomer having at least 2 polymerizable double bonds,
where a polymer obtained from the monomer mixture (c) has a glass transition temperature of lower than 25° C.

The monomer mixture (i) is a mixture of the following monomer (i1), monomer (i2), monomer (i3) and polyfunctional monomer (i4).
(i1) at least 9.9% by mass and no greater than 90% by mass of alkyl acrylate ester;
(i2) at least 9.9% by mass and no greater than 90% by mass of alkyl methacrylate ester;
(i3) at least 0% by mass and no greater than 20% by mass of another monomer having 1 polymerizable double bond; and
(i4) at least 0.1% by mass and no greater than 10% by mass of a polyfunctional monomer having at least 2 polymerizable double bonds. However, a glass transition temperature of a polymer obtained from the monomer mixture (i) is preferably at least 25° C. and no greater than 100° C.

The monomer mixture (g) is a mixture of the following monomer (g1), monomer (g2), and monomer (g3).
(g1) 0 to 20% by mass of alkyl acrylate ester;
(g2) 51 to 100% by mass of alkyl methacrylate ester; and
(g3) 0 to 49% by mass of another monomer having 1 polymerizable double bond.

[Monomer Mixture (c)]

The alkyl group in the monomer (c1) can be either straight chain or branched chain. In addition, the carbon number of the alkyl group is preferably 1 to 8, and more preferably no greater than 4, from the viewpoint of heat resistance of the polymer (G). Specific examples of the monomer (c1) include: methyl acrylate, ethyl acrylate, propyl acrylate, n-butyl acrylate, 2-ethyl hexyl acrylate, n-octyl acrylate and the like. These can be used singly or in a blend of at least 2 kinds. Among these, n-butyl acrylate is preferable from the viewpoint of molding whitening-resistance and shock resistance of the polymer (G).

The alkyl group in the monomer (c2), which is used as an optional component, can be either straight chain or branched chain. In addition, the carbon number of the alkyl group is preferably no greater than 4, from the viewpoint of heat resistance of the polymer (G). Specific examples of the monomer (c2) include: methyl methacrylate, ethyl methacrylate, propyl methacrylate, n-butyl methacrylate and the like. These can be used singly, or in combination of at least 2 kinds. Among these, methyl methacrylate is preferable from the viewpoint of surface hardness and heat resistance of the film (Y).

The monomer (c3) used as an optional component is a monomer other than the monomer (c1) and the monomer (c2) having 1 polymeric double bond. As the monomer (c3), for example, (meth)acrylic monomers such as lower alkoxy acrylate, cyanoethyl acrylate, acrylamide, acrylic acid, and methacrylic acid; styrene, alkyl substituted styrene, acrylonitrile, methacrylonitrile; unsaturated dicarboxylic acid anhydride such as maleic anhydride and itaconic anhydride; N-phenylmaleimide, N-cyclohexylmaleimide; and the like can be specifically exemplified. These can be used singly or in a blend of at least 2 kinds.

As the polyfunctional monomer (c4), a polyfunctional monomer (c41) that has at least 2 "double bonds having the same polymerization reactivity" and a polyfunctional monomer (c42) that has at least 2 "double bonds having different polymerization reactivity" can be exemplified.

As the former polyfunctional monomer (c41), alkylene glycol dimethacrylate such as ethylene glycol dimethacrylate, 1,3-butyleneglycol dimethacrylate, 1,4-butyleneglycol dimethacrylate, and propyleneglycol dimethacrylate is preferable. In addition, polyvinyl benzene such as divinylbenzene, the trivinylbenzene and the like can also be used. In addition, polyvinyl benzene such as divinylbenzene, the trivinylbenzene and the like can also be used. These can be used singly or in a blend of at least 2 kinds. Among these, 1,3-butyleneglycol dimethacrylate is preferable from the viewpoint of molding whitening-resistance of the film (Y).

The latter polyfunctional monomer (c42) is a monomer so-called graft crosslinking agent. Specific examples thereof include allyl ester, metallyl ester or crotyl ester and the like of copolymerizable $\alpha,\beta$-unsaturated carboxylic acid or dicarboxylic acid. In a case of using these compounds as the graft crosslinking agent, a conjugated unsaturated bond of an ester thereof reacts and forms a chemical bond far faster than an allyl group, a methallyl group, and a crotyl group. An allyl ester of acrylic acid, methacrylic acid, maleic acid, or fumaric acid is particularly preferable from the viewpoint of molding whitening-resistance of the film (Y). Among these, methacrylic acid allyl ester provides a superior effect and therefore is preferable. These can be used singly or in a blend of at least 2 kinds.

In addition to the above described monomers, a chain transfer agent can be included in the monomer mixture (c). It should be noted that the chain transfer agent can be selected as appropriate from those used for normal radical polymerization. Specific examples thereof include: alkyl mercaptan having a carbon number of 2 to 20, mercapto acids, thiophenol, carbon tetrachloride and the like. The amount of the chain transfer agent being used is not particularly limited; however, preferably 0 to 5 parts by mass with respect to the monomer mixture (c) being 100 parts by mass.

The content of the monomer (c1) in the monomer mixture (c) is preferably at least 50% by mass from the viewpoint of molding whitening-resistance and shock resistance of the film (Y), and no greater than 99.9% by mass from the viewpoint of surface hardness and heat resistance of the film (Y). The content is more preferably at least 55% by mass and particularly preferably at least 60% by mass, from the viewpoint of molding whitening-resistance of the film (Y). In addition, the upper limit thereof is more preferably no greater than 79.9% by mass and particularly preferably no greater than 69.9% by mass, from the viewpoint of surface hardness and heat resistance of the film (Y).

The content of the monomer (c2) in the monomer mixture (c) is preferably 0 to 49.9% by mass. The molding whitening-resistance of the film (Y) can be easily improved by including no greater than 49.9% by mass of the monomer (c2). In addition, the content of the monomer (c2) in the monomer mixture (c) is more preferably at least 20% by mass and particularly preferably at least 30% by mass, from the viewpoint of surface hardness and heat resistance of the film (Y). The content is more preferably no greater than 44.9% by mass and particularly preferably no greater than 39.9% by mass, from the viewpoint of molding whitening-resistance of the film (Y).

The content of the monomer (c3) in the monomer mixture (c) is preferably 0 to 20% by mass. By including no greater than 20% by mass of the monomer (c3), the refractive index difference between the rubber-containing polymer (G) and the thermoplastic polymer (A2) can be lowered, thereby easily improving transparency of the film (Y). In addition, the content of the monomer (c3) in the monomer mixture (c) is more preferably at least 0.1% by mass from the viewpoint of transparency of the film (Y), and no greater than 15% by mass from the viewpoint of molding whitening resistance and shock resistance of the film (Y).

The content of the polyfunctional monomer (c4) in the monomer mixture (c) is preferably 0.1 to 10% by mass. The molding whitening-resistance of the film (Y) can be easily improved by setting the content of the polyfunctional monomer (c4) to no greater than 10% by mass. The content is more preferably at least 0.1% by mass and particularly preferably at least 3% by mass, from the viewpoint of molding whitening-resistance of the film (Y). In addition, the upper limit thereof is more preferably no greater than 6% by mass and particularly preferably no greater than 5% by mass, from the viewpoint of providing sufficient flexibility and toughness to the film (Y).

In order to make the monomer mixture (g) graft polymerized in the presence of the polymer (C), it is preferable that at least the graft crosslinking agent is included as the polyfunctional monomer (c4). The content of the graft crosslinking agent in the monomer mixture (c) is preferably at least 0.1% by mass. By setting the content of the graft crosslinking agent to at least 0.1% by mass, the molding whitening-resistance of the film (Y) is improved and the film (Y) can be easily molded without deteriorating optical physical properties, such as transparency, thereof. The content is more preferably at least 0.5% by mass. In addition, by setting the content of the graft crosslinking agent to no greater than 10% by mass, sufficient flexibility and toughness can be provided to the film (Y). The content is more preferably no greater than 6% by mass and particularly preferably no greater than 5% by mass.

Tg of the polymer (G) obtained from the above described monomer mixture (c) is preferably lower than 25° C. from the viewpoint of molding whitening-resistance and shock resistance of the film (Y). Tg is more preferably no higher than 10° C. and particularly preferably no higher than 0° C. With Tg being no higher than 10° C., the film (Y) obtained from the polymer (G) and the polymer (A2) can easily develop superior shock resistance. In addition, from the viewpoint of surface hardness and heat resistance of the film (Y), Tg of the polymer (G) is preferably at least −60° C. and more preferably at least −50° C.

The amount of the monomer mixture (c) being used is preferably 15 to 50% by mass in a total amount (100% by mass) of the monomer mixture (c) and the monomer mixture (g), or in a total amount (100% by mass) of the monomer mixture (c), the monomer mixture (g), and the monomer mixture (i). By setting the amount of the monomer mixture (c) being used to at least 15% by mass, molding whitening-resistance can be easily provided to the film (Y), and a film forming property and ductility, which is required for insertion molding and/or in-mold molding, can easily be realized simultaneously. In addition, by setting the amount of the monomer mixture (c) being used to no greater than 50% by mass, a laminated film can be easily obtained that provides surface hardness and heat resistance that are required for a laminated body as a member for automobile, at the same time. The amount of the monomer mixture (c) being used is more preferably at least 25% by mass and no greater than 35% by mass.

In polymerization of the monomer mixture (c), the monomer mixture (c) can be added to a polymerization container either at one time or in at least 2 steps for polymerization. From the viewpoint of molding whitening-resistance and shock resistance of the film (Y), the addition in at least 2 steps is preferable. In a case of polymerization in at least 2 steps, a component ratio of the monomers in the monomer mixture (c) can be either the same or different in each polymerization step. However, from the viewpoint of molding whitening-resistance and shock resistance of the film (Y), the component ratio of the monomers is preferably different in each polymerization step.

In a case of polymerization of the monomer mixture (c) in at least 2 steps, from the viewpoint of molding whitening-resistance, shock resistance, heat resistance and surface hardness of the film (Y), it is preferable that Tg of a polymer obtained only from the monomer mixture (c1) used in a first step is lower than Tg of a polymer obtained only from the monomer mixture (c2) used in a second step. More specifically, Tg of the polymer obtained only from the monomer mixture (c1) used in the first step is preferably lower than −30° C. from the viewpoint of molding whitening-resistance and shock resistance of the film (Y), and at least −60° C. from the viewpoint of surface hardness and heat resistance of the film (Y). In addition, Tg of the polymer obtained only from the monomer mixture (c2) used in the second step is preferably at least −15° C. and no higher than 10° C., from the viewpoint of surface hardness and heat resistance of the film (Y).

In a case of polymerization of the monomer mixture (c) in 2 steps, from the viewpoint of molding whitening-resistance and shock resistance of the film (Y), it is preferable that the amount the monomer mixture (c1) being used in the first step is at least 1% by mass and no greater than 20% by mass, and the amount of the monomer mixture (c2) being used in the second step is at least 80% by mass and no greater than 99% by mass.

It should be noted that, in the present invention, the monomer mixture (c) can be polymerized in the presence of "minute seed particles". The minute seed particles can be manufactured by, for example, polymerizing a monomer mixture containing at least 40% by mass of methacrylic ester. In this case, the content of the "minute seed particles" is preferably no greater than 10% by mass in the rubber-containing polymer (G) being 100% by mass.

In the present invention, the polymer (C) is obtained by polymerization of the monomer mixture (c), and the rubber-containing polymer (G) can be obtained by graft polymerization of the monomer mixture (g) with the polymer (C). It should be noted that, as necessary, the rubber-containing polymer (G) can be obtained also by employing a polymer obtained by polymerization of the monomer mixture (c) and then polymerization of the monomer mixture (i) as the polymer (C), and by graft polymerization of the monomer mixture (g) with the polymer (C).

[Monomer Mixture (i)]

As a monomer (i1), a monomer (i2), a monomer (i3) and a polyfunctional monomer (i4) composing the monomer mixture (i), monomers similar to the above described monomer (c1), monomer (c2), monomer (c3), and the polyfunctional monomer (c4) can be used. A monomer used as the monomer (i1) and a monomer used as the monomer (c1) can be either the same compound or different compounds. Such a relationship applies also to: between compounds used as the monomer (i2) and the monomer (c2); between compounds used as the monomer (i3) and the monomer (c3); and between compounds used as the monomer (i4) and the monomer (c4).

The above described chain transfer agent can be added to the monomer mixture (i). The amount of the chain transfer agent being used is not particularly limited; however, preferably 0 to 5 parts by mass with respect to the monomer mixture (i) being 100 parts by mass.

The content of the monomer (i1) in the monomer mixture (i) is preferably at least 9.9% by mass from the viewpoint of molding whitening-resistance and shock resistance of the film (Y), and no greater than 90% by mass from the viewpoint of surface hardness and heat resistance of the film (Y). The content is more preferably at least 19.9% by mass and particularly preferably at least 29.9% by mass, from the viewpoint of molding whitening-resistance of the film (Y). In addition, the upper limit thereof is more preferably no greater than 60% by mass and particularly preferably no greater than 50% by mass, from the viewpoint of surface hardness and heat resistance of the film (Y).

The content of the monomer (i2) in the monomer mixture (i) is preferably at least 9.9% by mass from the viewpoint of surface hardness and heat resistance of the film (Y), and no greater than 90% by mass from the viewpoint of molding whitening-resistance and shock resistance of the film (Y). The content is more preferably at least 39.9% by mass and particularly preferably at least 49.9% by mass, from the viewpoint of surface hardness and heat resistance of the film (Y). In addition, the upper limit thereof is more preferably no greater than 80% by mass and particularly preferably no greater than 70% by mass, from the viewpoint of molding whitening-resistance and shock resistance of the film (Y).

The content of the monomer (i3) in the monomer mixture (i) is preferably 0 to 20% by mass. By setting the content to no greater than 20% by mass, the refractive index difference between the rubber-containing polymer (G) and the thermoplastic polymer (A2) can be lowered, thereby easily improving transparency of the film (Y). The content is more preferably at least 0.1% by mass from the viewpoint of transparency of the film (Y), and more preferably no greater than 15% by mass from the viewpoint of molding whitening-resistance of the film (Y).

The content of the polyfunctional monomer (i4) in the monomer mixture (i) is preferably 0.1 to 10% by mass. By setting the content to no greater than 10% by mass, the molding whitening-resistance of the film (Y) can be easily improved. The content is more preferably at least 0.1% by mass and particularly preferably at least 0.5% by mass, from the viewpoint of molding whitening-resistance of the film (Y). The content is more preferably no greater than 6% by mass and particularly preferably no greater than 3% by mass, from the viewpoint of providing sufficient flexibility and toughness to the film (Y).

In order to make the monomer mixture (g) graft polymerized in the presence of the polymer (C) obtained by polymerization of the monomer mixture (i), it is preferable that at least the graft crosslinking agent is included as the polyfunctional monomer (i4). The content of the graft crosslinking agent in the monomer mixture (i) is preferably at least 0.1% by mass. By setting the content of the graft crosslinking agent to at least 0.1% by mass, the molding whitening-resistance of the film (Y) is improved and the film (Y) can be easily molded without deteriorating optical physical properties, such as transparency. The content is more preferably at least 0.5% by mass. In addition, by setting the content of the graft crosslinking agent to no greater than 10% by mass, sufficient flexibility and toughness can be easily provided to the film (Y). The content of the graft crosslinking agent is more preferably no greater than 6% by mass and particularly preferably no greater than 3% by mass.

Tg of a polymer obtained from the above described monomer mixture (i) is preferably at least 25° C. and no greater than 100° C. With Tg of at least 25° C., the surface hardness and heat resistance of the film (Y) can easily achieve a level required for a member for automobile. Tg of the polymer is more preferably at least 40° C. and particularly preferably at least 50° C. In addition, with Tg of no greater than 100° C., the film (Y) that is superior in molding whitening-resistance and the film forming property can be easily obtained. Tg of the polymer is more preferably no greater than 80° C. and particularly preferably no greater than 70° C.

In polymerization of the monomer mixture (i), the amount of the monomer mixture (i) being used is preferably at least 5% by mass and no greater than 35% by mass in a total amount (100% by mass) of the monomer mixture (c), the monomer mixture (g), and the monomer mixture (i). With the amount of the monomer mixture (i) being used within this range, functions of molding whitening-resistance, surface hardness, and heat resistance can be easily developed in the film (Y), and a film forming property and ductility, which is required for insertion molding and/or in-mold molding, can be easily provided to the film (Y). The amount of the monomer mixture (i) being used is more preferably at least 7% by mass and no greater than 20% by mass.

In polymerization of the monomer mixture (i), the monomer mixture (i) can be added to a polymerization container either at one time or in at least 2 steps for polymerization. In a case of polymerization in at least 2 steps, a component ratio of the monomers can be either the same or different in each polymerization step.

As described above, in a case of polymerizing the monomer mixture (c) that gives a polymer having a glass transition temperature of lower than 25° C., and then polymerizing the monomer mixture (i) that gives a polymer having a glass transition temperature of 25° C. to 100° C., polymer particles having a 2-layer structure composed of an inner layer polymer with a lower Tg and an outer layer polymer with a higher Tg. In the present invention, the rubber-containing polymer (G) can be obtained by graft polymerization of the monomer mixture (g) with the polymer particles of 2-layer structure.

[Monomer Mixture (g)]

The monomer mixture (g) is a mixture composed of: alkyl acrylate ester (g1); alkyl methacrylate ester (g2); and another monomer having 1 polymerizable double bond (g3). As the monomer (g1), the monomer (g2), and the monomer (g3), monomers similar to the monomer (c1), the monomer (c2), and the monomer (c3) can be used. A monomer used as the monomer (g1) and a monomer used as the monomer (c1) can be either the same compound or different compounds. Such a relationship applies also to: between compounds used as the monomer (g2) and the monomer (c2); and between compounds used as the monomer (g3) and the monomer (c3).

The above described chain transfer agent can be contained in the monomer mixture (g). From the viewpoint of a film forming property of the film (Y), the amount of the chain transfer agent being used is preferably 0.01 to 5 parts by mass with respect to the monomer mixture (g) being 100 parts by mass. The lower limit is more preferably at least 0.2 parts by mass and particularly preferably at least 0.4 parts by mass.

The content of the monomer (g2) in the monomer mixture (g) is preferably 51 to 100% by mass. The heat resistance of the film (Y) can be easily improved by including at least 51% by mass of the monomer (g2). The content of the monomer (g2) is more preferably at least 80% by mass and particularly preferably at least 93% by mass, from the viewpoint of surface hardness and heat resistance of the film (Y). In addition, the upper limit of the content is more preferably no greater than 99% by mass, from the viewpoint of thermal decomposition resistance of the film (Y).

The content of the monomer (g1) in the monomer mixture (g) is preferably 0 to 20% by mass. The thermal decomposition resistance of the film (Y) can be easily improved by including no greater than 20% by mass of the monomer (g1). The content of the monomer (g1) is more preferably at least 1% by mass, from the viewpoint of thermal decomposition resistance of the film (Y). In addition, the upper limit thereof is more preferably no greater than 10% by mass and particularly preferably no greater than 7% by mass, from the viewpoint of heat resistance of the film (Y).

The content of the monomer (g3) in the monomer mixture (g) is preferably 0 to 49% by mass. By including no greater than 49% by mass of the monomer (g3), the refractive index difference between the rubber-containing polymer (G) and the thermoplastic polymer (A2) can be lowered, thereby easily improving transparency of the film (Y). The content of the monomer (g3) is more preferably at least 0.1% by mass from the viewpoint of transparency of the film (Y), and more preferably no greater than 15% by mass from the viewpoint of surface hardness and heat resistance of the film (Y).

The amount of the monomer mixture (g) being used is preferably 15 to 80% by mass in a total amount (100% by mass) of the monomer mixture (c) and the monomer mixture (g), or in a total amount (100% by mass) of the monomer mixture (c), the monomer mixture (g), and the monomer mixture (i). If the amount of the monomer mixture (g) being used is at least 15% by mass, the surface hardness and heat resistance of the film (Y) can be easily made superior. The amount being used is more preferably at least 45% by mass. If the amount being used is no greater than 80% by mass, the film (Y) having molding-whitening resistance can be easily obtained, and ductility, which is required for insertion molding and in-mold molding, can be easily provided to the film (Y). The amount being used is more preferably no greater than 70% by mass.

In polymerization of the monomer mixture (g), the monomer mixture (g) can be added to a polymerization container either at one time or in at least 2 steps for polymerization. In a case of polymerization in at least 2 steps, a component ratio of the monomers in the monomer mixture (g) can be either the same or different in each polymerization step.

Tg of the polymer (G) obtained from the above described monomer mixture is preferably at least 60° C. With Tg of at least 60° C., the film (Y) having surface hardness and heat resistance suitable for a member for automobile can be easily obtained. Tg of the polymer (G) is more preferably at least 80° C. and particularly preferably at least 90° C. In addition, from the viewpoint of moldability of the film (Y), Tg of the polymer (G) is preferably no greater than 150° C. and more preferably no greater than 130° C.

[Method of Polymerization of Polymer (G)]

A method of polymerization of the polymer (G) is not particularly limited; however, a sequential multistage polymerization method by emulsion polymerization is most suitable. For example, a method of: performing emulsion polymerization of the monomer mixture (c) in the presence of water, a surface active agent, and a polymerization initiator; and then feeding the monomer mixture (g) to polymerize the monomer mixture (g), can be exemplified. Alternatively, an emulsion suspension polymerization method of: performing emulsion polymerization of the monomer mixture (c) and the monomer mixture (i); and then performing suspension polymerization of the monomer mixture (g), can be employed.

In a case of manufacturing the rubber-containing polymer (G) by emulsion polymerization, a method of: preparing an emulsion by blending the monomer mixture (c), water, and the surface active agent in advance; feeding the emulsion into a reaction vessel to polymerize; and then feeding the monomer mixture (i) and the monomer mixture (g) sequentially into the reaction vessel to polymerize, is preferable. It should be noted that, in the present invention, feed of the monomer mixture (i) can be omitted. On the other hand, the monomer mixture (c) can be polymerized in the presence of "minute seed particles" prepared by emulsion polymerization.

By feeding the emulsion thus prepared in advance into the reaction vessel and polymerizing, the rubber-containing polymer (G) can be easily obtained characterized in that, in a case in which the rubber-containing polymer (G) is dispersed in a dispersion medium (for example, acetone), the number of particles of at least 55 μm in diameter in the dispersion liquid is 0 to 50 per 100 g of the polymer (G). The film (Y) using the rubber-containing polymer (G) as a raw material is characterized by a small number of fish eyes on the film. The film provides high printability and therefore is preferable, as the film rarely causes print omission in gravure printing of a pale wood pattern with a low printing pressure which is likely to cause print omission, or in single-color gravure printing in a metallic color, a jet black color or the like.

As the surface active agent used in preparation of the emulsion, anionic, cationic, and nonionic surface active agents can be used; particularly, the anionic surface active agent is preferable from the viewpoint of hot water whitening resistance of the film (Y). As the anionic surface active agent include: rosin soap; carboxylates such as potassium oleate, sodium stearate, sodium myristate, sodium n-lauroyl sarcosinate, and dipotassium alkenylsuccinate; sulfuric ester salts such as sodium lauryl sulfate; sulfonates such as sodium dioctyl sulfosuccinate, sodium dodecylbenzenesulfonate, sodium alkyldiphenyletherdisulfonate; and phosphate salts such as polyoxyethylene alkyl phenyl ether sodium phosphate and polyoxyethylene alkyl ether sodium phosphate can be exemplified.

Among these, phosphate salts such as polyoxyethylene alkyl ether sodium phosphate is preferable from the viewpoint of hot water whitening resistance of the film (Y).

Examples of the surface active agent includes: NC-718 (trade name, manufactured by Sanyo Chemical Industry Co., Ltd.); Phosphanol LS-529, Phosphanol RS-610NA, Phosphanol RS-620NA, Phosphanol RS-630NA, Phosphanol RS-640NA, Phosphanol RS-650NA, Phosphanol RS-660NA (trade names, manufactured by Toho Chemical Industry Co., Ltd.); LATEMUL P-0404, LATEMUL P-0405, LATEMUL P-0406, LATEMUL P-0407 (trade names, manufactured by Kao Corporation) and the like.

As a method for preparing the emulsion, any of the following can be employed: (1) a method of adding the monomer mixture and then the surface active agent to water; (2) a method of adding the surface active agent and then the monomer mixture to water; and (3) a method of adding the surface active agent and then water to the monomer mixture. Among these, the method (1) and the method (2) are preferable from the viewpoint of reduction of fish eyes on the film.

As a device for preparing the emulsion, a forced emulsification device such as homogenizer and homomixer, and a membrane emulsification device can be exemplified.

The emulsion can be either W/O type in which water droplets are dispersed in monomer, or O/W type in which monomer droplets are dispersed in water. However, from the viewpoint of reduction of fish eyes on the film, the emulsion of O/W type in which monomer droplets are dispersed in water, the droplet being no greater than 100 μm in diameter, is preferable.

As a polymerization initiator used for polymerization of the monomer mixture (c), the monomer mixture (i) and the monomer mixture (g), a peroxide, an azo initiator, and a redox initiator in which an oxidizing agent and a reducing agent are combined can be exemplified. Among these, from the viewpoint of radical generation efficiency, the redox initiator is preferable; particularly, a sulfoxylate initiator is preferable in which ferrous sulfate, disodium ethylenediaminetetraacetate salt, Rongalite, and hydroperoxide are combined. The amount of the polymerization initiator being used can be set as appropriate according to polymerization conditions and the like. In addition, the polymerization initiator can be added to one or both of a water phase and a monomer phase.

As a polymerization method of the rubber-containing polymer (G), the following method is particularly preferable from the viewpoint of polymerization stability. First, a solution is prepared by adding ferrous sulfate, disodium ethylenediaminetetraacetate salt, Rongalite, and water into a reaction vessel and the solution is heated up to a polymerization temperature. Meanwhile, the monomer mixture (c), the polymerization initiator such as peroxide, water, and the surface active agent are blended to prepare the emulsion. Next, the emulsion is fed to the reaction vessel after heating to thereby polymerize the monomers. And then, the monomer mixture (i) as well as the polymerization initiator such as peroxide is fed to the reaction vessel to polymerize. Thereafter, the monomer mixture (g) as well as the polymerization initiator such as peroxide is fed to the reaction vessel to polymerize. It should be noted that, in the present invention, feed and polymerization of the monomer mixture (i) is not obligatory and can be omitted.

The polymerization temperature varies according to a kind of the polymerization initiator and an amount thereof; however, generally, the polymerization temperature is preferably at least 40° C., more preferably at least 60° C., and preferably no higher than 120° C., more preferably no higher than 95° C. from the viewpoint of polymerization stability.

Latex containing the rubber-containing polymer (G) obtained by the above described method is preferably processed by using a filtration device. By this filtration processing, scales generated during polymerization steps, impurities in raw materials, and foreign substances mixed thereinto from external environment during polymerization steps can be removed from the latex.

The rubber-containing polymer (G) can be obtained by collecting the rubber-containing polymer (G) from the latex produced by the above described method. As a method for collecting the rubber-containing polymer (G) from the latex, methods such as salting out, acid deposition, spray drying, freeze drying can be exemplified. By these method, the rubber-containing polymer (G) is collected in a form of powder.

[Thermoplastic Polymer (A2)]

In the present invention, the thermoplastic polymer (A2) that can compose a part of the acrylic resin composition (Y) is a polymer that contains at least 50% by mass of an alkyl methacrylate ester unit. The content of the alkyl methacrylate ester unit in the polymer (A2) is more preferably 50 to 100% by mass, and particularly preferably at least 80% by mass and no greater than 99.9% by mass from the viewpoint of surface hardness and heat resistance of the film (Y).

Specific examples of the monomer as a raw material for the alkyl methacrylate ester unit composing the polymer (A2) include: methyl methacrylate, ethyl methacrylate, propyl methacrylate, n-butyl methacrylate and the like. An alkyl group in alkyl methacrylate ester can be either branched chain or straight chain, and the carbon number of the alkyl group is preferably no greater than 4, from the viewpoint of heat resistance of the film (Y). Among these, methyl methacrylate is more preferable from the viewpoint of heat resistance of the film (Y). These may be used singly or in combination of at least 2 kinds.

In addition, the polymer (A2) can contain 0 to 50% by mass of alkyl acrylate ester unit and 0 to 50% by mass of other monomer unit, which is different from these 2 monomer units, as optional components.

The content of alkyl acrylate ester unit in the polymer (A2) is preferably 0 to 50% by mass, from the viewpoint of providing film forming property and ductility, which allows insertion molding and/or in-mold molding, to the film (Y). The content is more preferably at least 0.1% by mass and no greater than 20% by mass.

As the monomer as a raw material for the alkyl acrylate ester unit, methyl acrylate, ethyl acrylate, propyl acrylate, n-butyl acrylate and the like can be used. An alkyl group in alkyl acrylate ester can be either branched chain or straight chain, and the carbon number of the alkyl group is preferably no greater than 4, from the viewpoint of heat resistance of the film (Y). Among these, methyl acrylate is more preferable from the viewpoint of heat resistance of the film (Y). These may be used singly or in combination of at least 2 kinds.

In addition, the content of the "another monomer unit" in the polymer (A2) is preferably 0 to 50% by mass, from the viewpoint of moldability of the film (Y). The content is more preferably at least 0% by mass and no greater than 20% by mass.

As the "another monomer", a raw material for the "another monomer unit", well-known monomers can be used as necessary. For example, aromatic vinyl compounds such as styrene; vinyl cyanide monomers such as acrylonitrile; unsaturated dicarboxylic acid anhydride such as maleic anhydride, itaconic acid anhydride; N-phenylmaleimide;

and N-cyclohexyl maleimide can be exemplified. These may be used singly or in combination of at least 2 kinds.

The content of each of the monomer units in the polymer (A2) can be determined by gas chromatography-mass spectrometry.

In addition, reduced viscosity of the polymer (A2) is preferably no greater than 0.15 L/g and more preferably no greater than 0.1 L/g from the viewpoint of insertion moldability, in-mold moldability, and the film forming property of the film (Y). Furthermore, reduced viscosity of the polymer (A2) is preferably at least 0.01 L/g and more preferably at least 0.03 L/g, from the viewpoint of film forming property of the film (Y). It should be noted that the "reduced viscosity" is viscosity of 0.1 g the polymer dissolved in 100 ml of chloroform, measured at 25° C.

As described above, the polymer (A2) is preferably a polymer or a copolymer having the reduced viscosity of no greater than 0.15 L/g obtained by polymerizing or copolymerizing: 50 to 100% by mass of alkyl methacrylate ester in which the carbon number of alkyl group is at least 1 and no greater than 4; 0 to 50% by mass of alkyl acrylate ester; and 0 to 50% by mass of the above described "other monomer".

The thermoplastic polymer (A2) can be used singly or in combination of at least 2 kinds. However, by using at least 2 kinds of the thermoplastic polymer (A2) in combination, the surface hardness and heat resistance of the film (Y) can be easily improved. Therefore, from the viewpoint of heat resistance of the film (Y), the glass transition temperature of the polymer (A2) is preferably at least 80° C. and more preferably at least 90° C.

The mass average molecular weight of the polymer (A2) is preferably at least 30,000 from the viewpoint of the mechanical property of the film (Y), and no greater than 200,000 from the viewpoint of moldability of the film (Y).

A method for producing the polymer (A2) is not particularly limited, and normal suspension polymerization, emulsion polymerization, bulk polymerization and the like can be employed for polymerization.

[Additives]

As described above, the film (Y) can include the various additives; among these, an UV absorber, a hindered amine light stabilizer (HALS), a radical scavenger such as antioxidant are preferably included. As the UV absorber, a well-known UV absorber can be used with no particular limitation, for improving weather resistance of the film. However, an UV absorber having a molecular weight of at least 300 is preferable, and an UV absorber having a molecular weight of at least 400 is more preferable from the viewpoint of bleed-out resistance. Particularly, a benzotriazole UV absorber having a molecular weight of at least 400 and a triazine UV absorber having a molecular weight of at least 400 can be preferably used. A specific example of the benzotriazole UV absorber includes TINUVIN 234 (trade name, manufactured by BASF Japan), Adekastab LA-31 (trade name, manufactured by ADEKA Corporation) and the like. Specific examples of the triazine UV absorber include TINUVIN 1577 (trade name, manufactured by BASF Japan) and the like. The amount of the UV absorber to be added is preferably 0.1 to 10 parts by mass and more preferably 0.2 to 5 parts by mass, with respect to 100 parts by mass of a resin component in the (Y) layer, from the viewpoint of bleed-out resistance.

In addition, in order to further improve weather resistance of the (Y) layer, it is preferable to use the hindered amine light stabilizer and antioxidant in combination with the UV absorber. Specific examples of the hindered amine light stabilizer include: Adekastab LA-57, Adekastab LA-62, Adekastab LA-67, Adekastab LA-63, and Adekastab LA-68 (trade names, manufactured by ADEKA Corporation); and Sanol LS-770, Sanol LS-765, Sanol LS-292, Sanol LS-2626, Sanol LS-1114, and Sanol LS-744 (trade names, manufactured by Sankyo Lifetech Co., Ltd.). The amount of the hindered amine light stabilizer to be added is preferably 0.1 to 10 parts by mass and more preferably 0.2 to 5 parts by mass, with respect to 100 parts by mass of a resin component in the (Y) layer, from the viewpoint of bleed-out resistance. As the antioxidant, for example, a phenol-based antioxidant, a sulfur-based antioxidant, and a phosphorus-based antioxidant can be used. The amount of the antioxidant to be added is preferably 0.05 to 10 parts by mass and more preferably 0.1 to 5 parts by mass, with respect to 100 parts by mass of a resin component in the (Y) layer, from the viewpoint of bleed-out resistance.

<Method for Producing Laminated Film>

The method for manufacturing the laminated film of the present invention is not particularly limited; however, a coextrusion method, in which the polymer blend (X) and the acrylic resin composition (Y) are laminated while being simultaneously melted and extruded, is preferable from the viewpoint of reducing manufacturing steps. As a specific method for laminating a plurality of melted resin layers, (1) a method of laminating melted resin layers before passing through a die such as a feed block method; (2) a method of laminating melted resin layers in a die such as a multi manifold method; and (3) a method of laminating melted resin layers after passing through a die such as a multi slot method can be exemplified. It should be noted that, in a case of laminating the polymer blend (X) and the acrylic resin composition (Y) by melting and extruding simultaneously, it is preferable to melt and extrude such that the (Y) layer is in contact with a cooling roller from the viewpoint of flatting a surface of the (X) layer.

More specifically, the laminated film of the present invention can be manufactured by, for example, a manufacturing method including the following steps:

employing 2 melting extruders and setting a cylinder temperature and a die temperature to be at least 200° C. and no greater than 250° C.;

in a first one of the extruders, melting and plasticizing the polymer blend (X);

meanwhile, in a second one of the extruders, melting and plasticizing the acrylic resin composition (Y); and coextruding the melted resins extruded from dies at front ends of the extruders onto a cooling roller that is set to at least 50° C. and no greater than 100° C.

A method for adding the above described additives is not particularly limited. For example, the additives can be directly fed to the extruder along with the polymer blend (X) or the acrylic resin composition (Y). Alternatively, the additives can be added to the polymer blend (X) or the acrylic resin composition (Y) in advance and kneaded in a kneader. As the kneader, a normal single screw extruder, a twin screw extruder, a banbury mixer, a roller kneader, and the like can be exemplified.

<Laminated Molded Article>

By laminating the laminated film of the present invention onto a surface of a base material such as various resin molded articles, wood products or metal formed products, a laminated body (laminated molded article) having a layer of the polymer blend (X) on a surface thereof can be manufactured. More specifically, the laminated film is vacuum-molded or pressure-molded in a first mold to thereby prepare a preform molded body; and a resin as a base material is injection-molded in a second mold to integrate the preform molded body with the base material, thereby giving the laminated molded article. It should be noted that, in a case of manufacturing the laminated molded article having a layer of the polymer blend (X) on a surface thereof, injection molding is performed such that the (X) layer is positioned on a surface of the molded article.

The base material can be selected as appropriate according to a target laminated molded article (above mentioned resin molded articles, wood products, metal formed products or the like); for example in a case of forming a resin molded article, a resin layer (for example, a thermoplastic resin layer) can be used as the base material. As the thermoplastic resin, an ABS resin (acrylonitrile butadiene styrene copolymer), a polycarbonate resin and the like can be exemplified.

In addition, the laminated film of the present invention can be used with print applied as necessary by an appropriate printing method, to thereby apply a design characteristic to various base materials. From the viewpoint of protecting the printed layer and providing a high quality appearance, it is preferable to provide a printed layer between the laminated film of the present invention and the various base materials. For purposes that utilizes the color tone of the base material, the laminated film of the present invention can be used as is. The laminated film of the present invention is especially superior for such purposes that utilize the color tone of the base material, compared to a polyvinylchloride film and a polyester film.

The laminated film of the present invention is especially suitable for a laminated molded article as a member for automobile, and a laminated molded article as a building material. Specific examples of the laminated molded articles include:

interior materials for automobile such as an instrument panel, a console box, a meter cover, a door lock bezel, a steering wheel, a power window switch base, a center cluster, and a dash board;

exterior materials for automobile such as a weather strip, a bumper, a bumper guard, a side mat guard, a body panel, a spoiler, a front grill, a strut mount, a wheel cap, a center pillar, a door mirror, a center ornament, a side molding, a door molding, a window molding, a window, a head lamp cover, a tail lamp cover, and a windproof member;

a front panel, a button, an emblem, a decorative surface material and the like of an AV device, an OA device, a furniture product, and the like;

a housing, a display window, a button and the like of a mobile telephone and the like;

exterior materials for furniture;

architectural interior materials for wall, ceiling, floor, and the like;

a marking film and a coating film for high luminance reflective material;

architectural exterior materials such as exterior wall such as siding, fence, roof, gate, verge board, and the like;

decorative surface materials of furniture such as window frame, door, handrail, threshold, crossbar, and the like;

optical members such as various displays, lens, mirror, goggles, window glass, and the like;

interior and exterior materials for various conveyances other than automobile, such as train, aircraft, ship, and the like;

various containers and packing materials such as bottle, cosmetic container, accessory case, and the like; and sundries such as gift product, accessory, and the like.

EXAMPLES

The present invention is further explained hereafter, by way of Examples and Comparative Examples. Preceding Examples, Production Examples for the rubber-containing polymer (G), the acrylic resin composition (Y), and the polymer blend (X) of the vinylidene fluoride resin (F) and the acrylic resin, as well as evaluation methods are explained.

Production Examples 1 to 7

Production Example 1

Rubber-Containing Polymer (G-1)

A container equipped with a stirrer was charged with 10.8 parts by mass of deionized water. And then, a monomer mixture (c-1) composed of: 0.3 parts by mass of MMA (methyl methacrylate); 4.5 parts by mass of n-BA (n-butyl acrylate); 0.2 parts by mass of 1,3-BD (1,3-butyleneglycol dimethacrylate); and 0.05 parts by mass of AMA (allyl methacrylate), as well as 0.025 parts by mass of CHP (cumene hydroperoxide) were added to the container and stirred for blending under ambient temperature. Thereafter, 1.3 parts by mass of an emulsifier (Phosphanol RS610NA (trade name) manufactured by Toho Chemical Industry Co., Ltd.) was added to the container while stirring, and stirring was continued for 20 minutes to thereby prepare an emulsion.

Subsequently, 139.2 parts by mass of deionized water was added to a polymerization vessel equipped with a cooling device, and heated up to 75° C. A mixture prepared by adding to 5 parts by mass of deionized water: 0.20 parts by mass of sodium formaldehyde sulfoxylate; 0.0001 parts by mass of ferrous sulfate; and 0.0003 parts by mass of EDTA (ethylenediaminetetraacetic acid) was then added to the polymerization vessel at one time. The emulsion was then added dropwise to the polymerization vessel for 8 minutes while stirring in a nitrogen atmosphere, and the reaction was continued for 15 minutes, thereby completing a first step of polymerization of the monomer mixture (c).

Thereafter, a monomer mixture (c-2) composed of: 9.6 parts by mass of MMA; 14.4 parts by mass of n-BA; 1.0 part by mass of 1,3-BD; and 0.25 parts by mass of AMA was added dropwise to the polymerization vessel along with 0.016 parts by mass of CHP for 90 minutes, and the reaction was continued for 60 minutes, thereby completing a second step of polymerization of the monomer mixture (c) and obtaining a polymer.

Thereafter, a monomer mixture (i-1) composed of: 6 parts by mass of MMA; 4 parts by mass of MA (methyl acrylate); and 0.075 parts by mass of AMA was added dropwise to the polymerization vessel along with 0.0125 parts by mass of CHP for 45 minutes, and the reaction was continued for 60 minutes, thereby obtaining a polymer (C-1).

Thereafter, a monomer mixture (g-1) composed of: 57 parts by mass of MMA; 3 parts by mass of MA; 0.264 parts by mass of n-OM (n-octyl mercaptan); and 0.075 parts by mass of t-BH (tertiary butyl hydroperoxide) was added dropwise to the polymerization vessel for 140 minutes, and the reaction was continued for 60 minutes, thereby graft polymerizing the monomer mixture (g-1) and obtaining latex of the rubber-containing polymer (G-1).

The latex of the rubber-containing polymer (G-1) thus obtained was filtered by using a vibration filtration device with a mesh made of SUS (average aperture: 62 μm) as a filter medium attached thereto. And then, salting out in an aqueous solution containing 3.5 parts by mass of calcium acetate and collection by washing with water took place. An aqueous material thus collected was dried to thereby obtain the rubber-containing polymer (G-1) in a powder form. Rubber content of the rubber-containing polymer (G-1) was 70% by mass.

Production Example 2

Acrylic Resin Composition (Y-1)

75 parts by mass of the above described rubber-containing polymer (G-1); 25 parts by mass of copolymer of MMA/MA as the thermoplastic polymer (A2) (MMA/MA=99/1 (mass ratio), mass-average molecular weight Mw: 100,000, Tg: 105° C.); 1.4 parts by mass of UV absorber (Tinuvin 234 (trade name) manufactured by BASF Japan); 0.3 parts by mass of a light stabilizer (Adekastab LA-57 (trade name) manufactured by ADEKA Corporation); and 0.1 parts by mass of phenol antioxidant (Irganox 1076 (trade name), manufactured by BASF Japan) were blended by using a Henschel mixer. The mixture thus obtained was fed to a vent type double screw extruder (TEM-35B (trade name) manufactured by TOSHIBA MACHINE CO., LTD.) heated to 200 to 240° C., and kneaded to obtain pellets of the acrylic resin composition (Y-1). Rubber content of the acrylic resin composition (Y-1) was 55% by mass.

Production Example 3

Polymer Blend (X-1)

75 parts by mass of Kynar720 (trade name) manufactured by ARKEMA K.K. as a vinylidene fluoride resin (F) (rate of hetero linkage: 10.5%); 25 parts by mass of copolymer of MMA/MA as the acrylic resin (A1) (MMA/MA=99/1 (mass ratio), mass-average molecular weight Mw: 100,000, Tg: 105° C.); and 0.1 parts by mass of Adekastab AO-60 (trade name) manufactured by ADEKA Corporation as an antioxidant were blended by using a Henschel mixer. The mixture thus obtained was fed to a vent type double screw extruder (TEM-35B (trade name) manufactured by TOSHIBA MACHINE CO., LTD.) heated to 180 to 220° C., and kneaded to obtain pellets containing the polymer blend (X-1).

Production Example 4

Polymer Blend (X-2)

Pellets containing the polymer blend (X-2) were obtained by the same method as Production Example 3 except for using copolymer of MMA/MA (MMA/MA=90/10 (mass ratio), mass-average molecular weight Mw: 100,000, Tg: 93° C.) as the acrylic resin (A1).

Production Example 5

Polymer Blend (X-3)

65 parts by mass of KF Polymer T#850 (trade name) manufactured by KUREHA Corporation as the vinylidene fluoride resin (F) (rate of hetero linkage: 8.5%); 35 parts by mass of copolymer of MMA/MA as the acrylic resin (A1) (MMA/MA=99/1 (mass ratio), mass-average molecular weight Mw: 100,000, Tg: 105° C.); and 0.1 parts by mass of Adekastab AO-60 (trade name) manufactured by ADEKA Corporation as an antioxidant were blended by using a Henschel mixer. The mixture thus obtained was fed to a vent type double screw extruder (TEM-35B (trade name) manufactured by TOSHIBA MACHINE CO., LTD.) heated to 180 to 220° C., and kneaded to obtain pellets containing the polymer blend (X-3).

Production Example 6

Polymer Blend (X-4)

Pellets containing the polymer blend (X-4) were obtained by the same method as Production Example 3 except for changing the amount of Kynar720 to 80 parts by mass and the amount of the copolymer of MMA/MA to 20 parts by mass.

Production Example 7

Polymer Blend (X-5)

Pellets containing the polymer blend (X-5) were obtained by the same method as Production Example 3 except for changing the amount of Kynar720 to 70 parts by mass and the amount of the copolymer of MMA/MA to 30 parts by mass.

<Evaluation Methods>

The methods for measuring the haze value and the pencil hardness of a laminated film, and measuring the heat of crystal fusion of the polymer blend (X) of the vinylidene fluoride resin (F) and the acrylic resin are as described above. For the haze value, a value at 25° C., without heat processing, is displayed as an initial value.

(1) Chemical Resistance of Laminated Film 0.2 ml of aqueous solution of lactic acid of 10% by mass is fed dropwise onto the (X) layer of the laminated film, left for 24 hours at 80° C., and a change in appearance of the laminated film is visually evaluated according to the following criteria:

+: No change in appearance; and
−: Change in appearance (swelling or turbidity).

(2) Appearance of Vacuum Molded Article

A laminated molded article is obtained by pasting together the laminated film and an ABS resin sheet (0.4 mm in thickness) by a hot press method. The laminated molded article is heated up to 180° C. by a vacuum pressure molding device and vacuum molded in molds of 50° C. and 80° C.; and then the appearance thereof is visually evaluated according to the following criteria:

++: No whitened part observed after vacuum molding in 80° C. mold;
+: Whitened part observed after vacuum molding in 80° C. mold, but no whitened part observed after vacuum molding in 50° C. mold; and
+: Whitened part observed after vacuum molding in 50° C. mold.

Examples 1 to 3 and Comparative Examples 1 to 4

Example 1

Multi manifold dies were installed at respective front end portions of a single screw extruder 1 of 40 mm in diameter and a single screw extruder 2 of 30 mm in diameter. The pellets of the acrylic resin composition (Y-1) obtained in Production Example 2 were fed to the single screw extruder 1 of 230 to 240° C. in cylinder temperature to be melted and plasticized. The pellets containing the polymer blend (X-1) obtained in Production Example 3 were fed to the single screw extruder 2 of 200 to 230° C. in cylinder temperature to be melted and plasticized. Melted plasticized products thus obtained were fed to the multi manifold dies heated up to 250° C., to thereby obtain a 2 layered laminated film with: a layer of the polymer blend (X) of the vinylidene fluoride resin (F) and the acrylic resin of 7.5 μm in thickness; and a layer of the acrylic resin composition (Y) of 67.5 μm in thickness. Here, the laminated film was obtained in such a way that the cooling roller is 90° C. in temperature and the acrylic resin composition (Y) is in contact with the cooling roller.

Heat of crystal fusion of the polymer blend (X), chemical resistance of the laminated film, the haze value of the laminated film before and after heating, pencil hardness of the (X) layer, and an evaluation result of the appearance of the vacuum molded article are shown in Table 1.

Comparative Example 1

A laminated film was obtained by the same method as Example 1 except for using the pellets containing the polymer blend (X-4) obtained in Production Example 6 instead of the pellets containing the polymer blend (X-1) obtained in Production Example 3. The evaluation result thereof is shown in Table 1.

Comparative Example 2

A laminated film was obtained by the same method as Example 1 except for using the pellets containing the polymer blend (X-5) obtained in Production Example 7 instead of the pellets containing the polymer blend (X-1) obtained in Production Example 3. The evaluation result thereof is shown in Table 1.

Comparative Example 3

A laminated film was obtained by the same method as Example 1 except for using the pellets containing the polymer blend (X-2) obtained in Production Example 4 instead of the pellets containing the polymer blend (X-1) obtained in Production Example 3. The evaluation result thereof is shown in Table 1.

Example 2

A laminated film was obtained by the same method as Example 1 except for using the pellets containing the polymer blend (X-3) obtained in Production Example 5 instead of the pellets containing the polymer blend (X-1) obtained in Production Example 3, and changing the amounts of the vinylidene fluoride resin (F) and the acrylic resin (A1) being used to the values shown in Table 1. The evaluation result thereof is shown in Table 1.

Example 3

A laminated film was obtained by the same method as Example 2 except for changing the amounts of the vinylidene fluoride resin (F) and the acrylic resin (A1) being used to the values shown in Table 1. The evaluation result thereof is shown in Table 1.

Comparative Example 4

A laminated film was obtained by the same method as Example 2 except for changing the amounts of the vinylidene fluoride resin (F) and the acrylic resin (A1) being used to the values shown in Table 1. The evaluation result thereof is shown in Table 1.

The laminated film of Comparative Example 1 had a high haze value after heating and cooling, and therefore the vacuum molded article had a poor appearance. The laminated films of Comparative Examples 2 and 4, in which the heat of crystal fusion of the polymer blend (X) was low, did not have sufficient chemical resistance. The laminated film of Comparative Example 3, in which the glass transition temperature of the acrylic resin (A1) composing the polymer blend (X) was lower than 95° C., did not have sufficient pencil hardness.

TABLE 1

|  |  |  | Example 1 | Example 2 | Example 3 | Comparative Example 1 | Comparative Example 2 | Comparative Example 3 | Comparative Example 4 |
|---|---|---|---|---|---|---|---|---|---|
| Polymer Blend (X) | Vinylidene Fluoride Resin (F) | KF Polymer T#850 (parts by mass) | 0 | 65 | 70 | 0 | 0 | 0 | 60 |
|  |  | Kynar 720 (parts by mass) | 75 | 0 | 0 | 80 | 70 | 75 | 0 |
|  | Acrylic Resin (A1) | Copolymer (MMA/MA = 99/1, Tg: 105° C.) (parts by mass) | 25 | 35 | 30 | 20 | 30 | 0 | 40 |
|  |  | Copolymer (MMA/MA = 90/10, Tg: 93° C.) (parts by mass) | 0 | 0 | 0 | 0 | 0 | 25 | 0 |
|  | Antioxidant | Adekastab AO-60 (parts by mass) |  |  |  |  | 0.1 |  |  |
|  |  | Heat of Crystal Fusion (J/g) | 26.1 | 22.1 | 23.6 | 32.6 | 19.8 | 28.0 | 19.7 |
| Acrylic Resin Composition (Y) | Rubber-containing Polymer (G) (parts by mass) |  |  |  |  |  | 75 |  |  |
|  | Thermoplastic Polymer (A2) (MMA/MA = 99/1(Mass Ratio)) |  |  |  |  |  | 25 |  |  |

TABLE 1-continued

|  |  | Example 1 | Example 2 | Example 3 | Comparative Example 1 | Comparative Example 2 | Comparative Example 3 | Comparative Example 4 |
|---|---|---|---|---|---|---|---|---|
| UV Absorber | Tinuvin 234 (parts by mass) |  |  |  | 1.4 |  |  |  |
| Light Stabilizer | Adekastab LA-57 (parts by mass) |  |  |  | 0.3 |  |  |  |
| Antioxidant | Irganox 1076 (parts by mass) |  |  |  | 0.1 |  |  |  |
| Haze Value | Initial | 0.7 | 0.5 | 0.7 | 2.1 | 0.6 | 0.7 | 0.5 |
|  | After Heating and Natural Cooling | 0.6 | 0.5 | 0.8 | 3.5 | 0.7 | 0.9 | 0.5 |
| Appearance of Vacuum Molded Article |  | + | ++ | ++ | − | ++ | + | ++ |
| Pencil Hardness |  | HB | HB | HB | HB | HB | B | HB |
| Chemical Resistance |  | + | + | + | + | − | + | − |

INDUSTRIAL APPLICABILITY

The laminated film of the present invention is especially suitable for a laminated molded article as a member for automobile, and a laminated molded article as a building material.

The invention claimed is:

1. A laminated film comprising:
   a layer of a polymer blend (X) comprising a vinylidene fluoride resin (F) and an acrylic resin (A1); and
   a layer of an acrylic resin composition (Y),
   wherein
   the acrylic resin (A1) has a glass transition temperature of 95 to 120° C.,
   the vinylidene fluoride resin (F) has a hetero linkage rate of no greater than 10%, and
   the laminated film satisfies the following conditions (1) to (3):
   (1) a haze value of no greater than 2 after the film is heated to 180° C. and then allowed to naturally cool until the temperature drops to 25° C.;
   (2) a pencil hardness of the layer of the polymer blend (X) is HB or harder; and
   (3) a heat of crystal fusion of the polymer blend (X) as determined using a differential scanning calorimeter is 22.1 to 40 J/g.

2. The laminated film according to claim 1, wherein the acrylic resin composition (Y) comprises a rubber-containing polymer (G) and a thermoplastic polymer (A2) that contains at least 50% by mass of an alkyl methacrylate ester unit.

3. The laminated film according to claim 2, wherein the rubber-containing polymer (G) is a rubber-containing polymer obtained by graft polymerization of a monomer mixture (g) specified below in the presence of a polymer (C) obtained by polymerization of a monomer mixture (c), wherein:
   the monomer mixture (c) comprises:
   (c1) 50 to 99.9% by mass of an alkyl acrylate ester;
   (c2) 0 to 49.9% by mass of an alkyl methacrylate ester;
   (c3) 0 to 20% by mass of another monomer having at least one polymerizable double bond; and
   (c4) 0.1 to 10% by mass of a polyfunctional monomer having at least 2 polymerizable double bonds,
   wherein a polymer obtained from the monomer mixture (c) has a glass transition temperature of lower than 25° C., and
   wherein the monomer mixture (g) comprises:
   (g1) 0 to 20% by mass of an alkyl acrylate ester;
   (g2) 51 to 100% by mass of an alkyl methacrylate ester; and
   (g3) 0 to 49% by mass of another monomer having 1 polymerizable double bond.

4. A laminated molded article comprising the laminated film according to claim 1.

5. A method for manufacturing a laminated molded article comprising: vacuum-molding or pressure-molding the laminated film according to claim 1 in a first mold to thereby prepare a preform molded body; and
   injection-molding a resin as a base material in a second mold to thereby integrate the preform molded body with the base material.

6. The laminated film according to claim 1, wherein a content ratio of the vinylidene fluoride resin (F) in the polymer blend (X) is 62 to 78% by mass.

7. The laminated film according to claim 1, wherein the heat of crystal fusion of the polymer blend (X) as determined using a differential scanning calorimeter is 22.1 to 30 J/g.

8. The laminated film according to claim 1, wherein the acrylic resin included in the polymer blend (X) has a mass average molecular weight of from at least 30,000 to less than 200,000.

9. The laminated film according to claim 1, wherein the acrylic resin present in the polymer blend (X) is a polymer obtained from a monomer of either acrylic ester or methacrylic ester.

10. The laminated film according to claim 9, wherein the methacrylic ester is selected from the group consisting of methyl methacrylate, tert-butyl methacrylate, tert-butylcyclohexyl methacrylate, and isobornyl methacrylate.

11. The laminated film according to claim 9, wherein the methacrylic ester is an alkyl methacrylate ester where the number of carbon atoms in the alkyl group is no greater than 4.

12. The laminated film according to claim 1, wherein the acrylic resin present in the polymer blend (X) is a polymer obtained from both acrylic ester and methacrylic ester.

13. The laminated film according to claim 1, wherein the acrylic resin present in the polymer blend (X) is a polymer comprising at least 70% by mass of a methacrylic ester unit.

14. The laminated film according to claim 1, wherein the acrylic resin present in the polymer blend (X) is a polymer comprising at least 80% by mass of an alkyl methacrylic ester unit.

15. The laminated film according to claim 1, wherein a ratio of a thickness of the layer (X) to a thickness of the layer (Y) is 1/25 to 1/4.

* * * * *